ABSTRACT

United States Patent [19]
Hatanaka et al.

[11] 3,862,082
[45] Jan. 21, 1975

[54] FLAME RETARDANT SILICONE RUBBER COMPOSITIONS

[75] Inventors: Masayuki Hatanaka; Ryooichi Mahekawa; Hideo Maruyama, all of Yokohama, Japan

[73] Assignee: Toshiba Silicone Kabushiki Kaisha, Tokyo, Japan

[22] Filed: Oct. 31, 1973

[21] Appl. No.: 411,396

[52] U.S. Cl.. 260/37 SB, 260/45.75 R, 260/46.5 G, 260/46.5 UA
[51] Int. Cl............................................. C08g 51/04
[58] Field of Search 260/45.75 R, 46.5 UA, 46.5 G, 260/37 SB

[56] References Cited
UNITED STATES PATENTS
3,539,530  11/1970  Karstedt........................ 260/45.75 R
3,692,737  9/1972  Laur............................ 260/45.75 R

*Primary Examiner*—Melvyn I. Marquis
*Attorney, Agent, or Firm*—Stewart and Kolasch, Ltd.

[57] ABSTRACT

Platinum in the form of a platinum compound and titanium dioxide treated with an organosilane or an organosiloxane are added to an ordinary siloxane rubber composition to improve the flame retardant property thereof.

15 Claims, No Drawings

FLAME RETARDANT SILICONE RUBBER COMPOSITIONS

BACKGROUND OF THE INVENTION

This invention relates to silicone rubber compositions having an improved flame retardancy.

In order to prevent fire hazards due to the failure of electrical machines and apparatus, the need for flame retardant insulating materials has long been desired.

It has been known that various silicone rubber compositions have excellent insulating characteristics and are more difficult to burn than other organic insulating materials. It has also been known that platinum is effective in giving flame retardancy to silicone rubber compositions and titanium dioxide has been used as a pigment or heat resistant additive for silicone rubbers. Addition of titanium dioxide to silicone rubber compositions, however, leads to deterioration of the mechanical properties and the electrical properties of the resulting silicone rubbers when they are immersed in water. But with a quantity of titanium dioxide that does not affect the electrical and mechanical properties of the silicone rubber it is impossible to impart them a desired degree of flame retardancy. It has also been proposed to incorporate a platinum compound and fumed titanium compound for the purpose of improving the flame retardant property of silicone rubbers. However, such silicone rubbers have disadvantages that they lose their flame retardant property when they are heated or exposed to moisture.

SUMMARY OF THE INVENTION

It is an object of this invention to provide novel silicone rubber compositions having an excellent flame retardancy, not degraded by heat or moisture and having no tendency of deteriorating their mechanical and electrical properties even though they are incorporated with titanium dioxide.

According to a broad aspect of this invention there is provided a silicone rubber composition of the class comprising a polydiorganosiloxane gum, a reinforcing inorganic filler and an organic curing agent characterized in that the silicone rubber composition further comprises from 10 to 150 parts by weight per million of platinum in the form of a platinum compound based on the weight of said polydiorganosiloxane gum, and from 0.3 to 30 parts by weight of titanium dioxide treated with an organosilane or an organosiloxane.

Advantageously, the base silicone rubber composition comprises (A) 100 parts by weight of a polydiorganosiloxane gum containing organic groups selected from the group consisting of methyl, vinyl and phenyl groups, the number of silicon-bonded organic groups being from 1.98 to 2.002 per silicon atom, the ratio of the number of the vinyl groups to the total number of the organic groups being from 0 to 2, said polydiorganosiloxane gum containing from 0 to 10 mole % of silicon-bonded phenyl groups, (B) from 10 to 100 parts by weight of a reinforcing inorganic filler, and (C) from 0.1 to 10 parts by weight of an organic curing agent. As described above, incorporation of platinum and titanium dioxide treated with an organosilane or an organosiloxane into the base silicone rubber composition unexpectedly improved the stability and the flame retardant property of the resulting silicone rubber.

The diorganosiloxane gum utilized in this invention as a base polymer comprises an organosilicon compound utilized to prepare ordinary silicone rubber compositions and consists of a polymer, a copolymer and/or a mixture of recurring units of dimethylsiloxane, phenylmethylsiloxane, diphenylsiloxane, methylvinylsiloxane and phenylvinylsiloxane. The base polymer contains an average of from 1.98 to 2.002 of silicon-bonded organic groups per silicon atom. Preferably, the base polymer contains up to 2 mole %, preferably up to 1 mole %, based on the total number of the organic groups, of vinyl groups, and up to 10 mole %, preferably up to 6 mole %, based on the total number of the organic groups, of phenyl groups. Vinyl groups in excess of 2 mole % decrease the heat resistant property of the resulting silicone rubber whereas phenyl groups in excess of 10 mole % greatly decrease the elasticity and workability or processability of the silicone rubber. Accordingly, the contents of both vinyl and phenyl groups should be selected within the ranges specified hereinabove.

The base polymer employed in this invention may be end-blocked with triorganosiloxy units or hydroxyl units or alkoxy groups. Examples of the end-blocking triorganosiloxy units are trimethylsiloxy, dimethylvinylsiloxy, methylphenylvinylsiloxy, methyldiphenylsiloxy and the like.

Any well known reinforcing inorganic filler, such as fumed silica may be used. The reinforcing silica filler may be treated with an organosiloxane, organosilane or organosilazane either before compounding or during compounding in a manner well known in the art. Of course, untreated silica filler can be added when desired. The reinforcing silica filler is added in an amount of from 10 to 100 parts by weight, preferably from 20 to 70 parts by weight based on 100 parts by weight of the polydiorganosiloxane gum. Too small amount of the reinforcing silica filler results in insufficient mechanical strength due to poor reinforcing effect, whereas addition of the silica filler in excess of the upper limit is practically impossible.

Any one of the known organic peroxides may be used for curing the silicone rubber composition of this invention. For example, bis-(2,4-dichlorobenzoyl)-peroxide, benzoyl peroxide, dicumyl peroxide, bis-(paradichlorobenzoyl) peroxide, tertiary-butylperbenzoate, 2,5-bis-(tertiary-butylperoxy-2,5-dimethylhexane, 2,5-bis-(tertiary-butylperoxy)-2,5-dimethylhexyne and di-tertiarybutyl peroxide are the illustrative organic peroxides. The organic peroxide is added in an amount of from 0.1 to 10 parts by weight, preferably from 0.3 to 3 parts, by weight based on 100 parts by weight of the polydiorganosiloxane gum.

According to this invention platinum in the form of a platinum compound is added in an amount of from 10 to 150 parts per million, preferably from 20 to 80 parts per million, by weight, based on the weight of the polydiorganosiloxane gum. Use of lesser amount of platinum cannot attain the object of this invention, whereas use of platinum in excess of the upper limit decreases the heat resistant property and the electrical characteristic and increases the cost of the resulting silicone rubber. Platinum is used in the form of a platinum compound which can be dispersed homogeneously in the silicone rubber composition. Examples of the platinum compounds that can be used in this invention are those in their hydrate form, such as $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_6 \cdot nH_2O$, $PtCl_4 \cdot nH_2O$, $PtCl_2$, $Na_2PtCl_4 \cdot nH_2O$ and $H_2PtCl_4 \cdot nH_2O$. The number of molecules ($n$) of water of crystallization present in these platinum compounds is not always definite, but generally, said compounds contain up to six molecules of water of crystallization. In addition, complex compounds of these platinum compounds with an aliphatic hydrocarbon, octyl alcohol or vinyl-containing siloxanes can also be used. The platinum compound can be used as a solution in an organic solvent, such as isopropyl alcohol, ethyl alcohol, benzene, toluene and xylene so as to cause the platinum compound to be uniformly mixed with the silicone rubber composition.

Titanium dioxide treated with an organosiloxane or an organosilane is one of the important components of this invention. The method of treating titanium dioxide with an organosiloxane or an organosilane may be the same as that for treating the reinforcing silica filler with an organosiloxane or an organosilane. Among the units that form the organosilane and the organosiloxane may be mentioned triorganosilyl, triorganosiloxane, diorganosilyl, diorganosiloxane, monoorganosilyl, monoorganosiloxane and the like units. The organosilane and organosiloxane may be used singly or in combination. The organosilane or organosiloxane suitable for treating titanium dioxide contains methyl and or phenyl groups bonded to silicon atoms. Advantageously, at least 1 mole % of the total number of the organic groups should be phenyl groups. It is essential to treat titanium dioxide with the organosilane or organosiloxane at a temperature of from 150°C to 400°C, preferably from 200°C to 350°C, for five minutes or more.

The titanium dioxide utilized in this invention may be any one of the well known titanium oxides which have been used as the pigment or heat resistant fillers for silicone rubbers. Fumed titanium dioxide having an average particle size of less than 0.1 micron was found most effective. Such fumed titanium dioxide is usually manufactured from titanium tetrachloride and is available on the market. To obtain titanium dioxide treated with an organosilane or an organosiloxane, from 1 to 500 parts by weight of the organosilane or organosiloxane is added to 100 parts by weight of the titanium dioxide and admixed thoroughly, and the resulting powdery or pasty composition is treated with heat. When this mixture is compounded by using a three roll rubber compounding mill for the purpose of pulverizing titanium dioxide, it is possible to obtain a product that can be readily dispersed in the silicone rubber composition. This technique is applicable to other type of silicone rubber, such as shrinkable silicone rubber, which is required to have flame retardancy.

Titanium dioxide treated as described above is added in an amount of from 0.3 to 30 parts by weight, preferably from 1 to 20 parts by weight based on 100 parts by weight of the polydiorganosiloxane gum. The treated titanium dioxide imparts more efficient flame retardancy even when it is used in a smaller amount than the original untreated titanium dioxide, so that not only the electrical and mechanical properties of the resulting silicone rubber are not adversely affected but also the flame retardancy and other properties of the silicone rubber are not degraded even after a prolonged exposure to the atmospher. Use of the treated titanium dioxide of less than the lower limit cannot attain the object of this invention, whereas use of the titanium dioxide in excess of the upper limit described above decreases the mechanical property, especially the tensile strength, and increases the tendency of the resulting silicone rubber to adhere to the compounding rolls, thus rendering it difficult to handle.

One or more of finely divided quarts, calcium carbonate, calcium zirconate, zirconium silicate, diatomaceous earth, iron oxide, untreated titanium dioxide, and carbon black substantially free of sulfur can be incorporated into the novel flame retardant silicone rubber composition of this invention. Further, heat resistant additives, antioxidants and process aids which have been used for silicone rubbers can also be added to the novel silicone rubber composition of this invention.

In practicing this invention, the order of adding various components to the silicone rubber composition is immaterial. The method of compounding various components may be carried out at room temperature or at an elevated temperature below 200°C. However, in the later case, the organic peroxide and the platinum compound should be added after the mixture has been cooled to room temperature.

The flame retardant silicone rubber composition of this invention is converted by heat curing into a silicone rubber having an excellent flame retardancy and a high elasticity. The silicone rubber thus obtained meets severe flame retardancy test requirements while conventional flame retardant silicone rubbers do not exhibit such resistance. Furthermore, the silicone rubber composition of the present invention exhibits said excellent flame retardancy without sacrificing its desired electrical and mechanical properties.

DESCRIPTION OF THE PREFERRED EMBODIMENTS

In order that those skilled in the art can better understand how the invention can be worked out, the following examples are given by way of illustration but not limitation.

EXAMPLE 1

To 100 parts by weight of a polydimethylsiloxane gum containing 0.2 mole % of methylsiloxane units and having a viscosity of 22,000,000 centistokes at 25°C, were added 50 parts by weight of fumed silica which was treated with dimethylsiloxane, 3.0 parts by weight of a linear siloxane acting as a process aid and obtained by hydrolyzing dimethyldichlorosilane, and 0.9 part by weight of 2,4-dichlorobenzoyl peroxide, and the mixture was compounded by ordinary cold compounding technique to obtain a silicone rubber composition. To the compound thus obtained were added various amounts of a 25% solution of chloroplatinic acid in isopropyl alcohol alcohol and, treated titanium dioxide in an amounts as shown in the following Table 1, said treated titanium dioxide being prepared by admixing, at a weight ratio of 1:1, an alkoxy end-blocked silicone fluid or oil containing 30 mole % of diphenylsiloxane units and 70 mole % of dimethylsiloxane units and having a viscosity of 80 centistokes at 25°C and fumed titanium dioxide and then heating the mixture at a temperature of 250°C for 4 hours. The resulting silicone rubber compositions were compounded and cured to obtain test specimens as shown in the following Table 1. In this Table, the amounts of the treated fumed titanium dioxide and those of untreated titanium dioxide employed for comparison are based on 100 parts by weight of the polydimethylsiloxane gums.

The silicone rubber compositions thus obtained were press cured at 120°C and under a pressure of 50 kg/cm² and the resulting silicone rubbers were cut into silicone rubber pieces, each 2mm thick, 10 mm wide and 100 mm long. After curing further each rubber piece at a temperature of 150°C for one hour, the pieces were subjected to a flame retardancy test as hereinafter defined.

The flame retardancy test involves (1) graduating at a spacing of 10 mm one longer side of the silicone rubber test piece, (2) placing the portion of the test piece 10 mm spaced apart from one end thereof above a blue flame having a temperature of about 1,100°C from a Bunsen burner having an inside diameter of 10 mm to heat the test piece for 15 seconds and (3) immediately thereafter suspending the test piece in a glass tube, 80 mm inside diameter and 200 mm long. The time required for the test piece to extinguish the flame and the burnt length were measured to determine the degree of flame retardant property. In Table 1, the term "burn length" means the length of the burnt zone minus 10 mm which represents the length of the test piece to which the flame was applied. The test results are shown in Table 1.

From these tables, it can be readily noted that the mechanical and electrical properties of the specimen of experiment No.9 are more excellent than those of the specimen of experiment No. 6.

EXAMPLE 2

Eight types of treated titanium dioxide were prepared as follows by varying the types and the proportions of organosilanes, organosiloxanes, fumed titanium dioxide, and treating conditions.

a. Fumed titanium dioxide and alkoxy end-blocked silicone oil having a viscosity of 80 centistokes at 25°C and containing 30 mole % of diphenyl siloxane units and 70 mole % of dimethylsiloxane units were mixed together at a weight ratio of 2:1 and the mixture was heat treated at a temperature of 250°C for 4 hours.

b. Fumed titanium dioxide and the same silicone oil as that used in (a) were mixed together at a weight ratio of 5:1 and the mixture was heat treated at a temperature of 250°C for 4 hours.

c. Fumed titanium dioxide and the same silicone oil as that used in (a) were mixed together at a weight ratio of 10:1 and the mixture was heat treated at a temperature of 250°C for 4 hours.

Table 1

| Experiment number | Pt (ppm) | Treated fumed TiO₂ (parts by weight) | Fumed TiO₂ (parts by weight) | Burning time (sec) | Burnt length (mm) |
| --- | --- | --- | --- | --- | --- |
| 1 | 0 | 0 | 0 | 168 | Completely burnt |
| 2 | 0 | 0 | 15 | 182 | do. |
| 3 | 0 | 15 | 0 | 178 | do. |
| 4 | 42.5 | 0 | 0 | 201 | 76 |
| 5 | 42.5 | 0 | 5 | 61 | 23 |
| 6 | 42.5 | 0 | 10 | 44 | 17 |
| 7 | 42.5 | 0 | 20 | 27 | 9 |
| 8 | 42.5 | 1 | 0 | 38 | 11 |
| 9 | 42.5 | 2 | 0 | 29 | 8 |
| 10 | 42.5 | 5 | 0 | 22 | 6 |
| 11 | 42.5 | 10 | 0 | 15 | 5 |
| 12 | 42.5 | 20 | 0 | 6 | 0 |

The specimens of experiment number 1 not containing platinum, treated fumed titanium dioxide and fumed titanium dioxide, experiment number 6 containing platinum and fumed titanium dioxide, and experiment number 9 containing platinum and treated fumed titanium dioxide were selected and their mechanical and electrical properties were measured for comparison. The mechanical properties measured were hardness, tensile strength and elongation while the electrical properties measured were volume resistivity and dielectric strength before and after immersion in water. The test results are shown in the following Tables 2 and 3.

d. Fumed titanium dioxide and the same silicone oil as that used in (a) were mixed together at a weight ratio of 1:1 and the mixture was heat treated at a temperature of 250°C for 10 minutes.

e. The same mixture as in (d) was heat treated at a temperature of 250°C for 16 hours.

f. The same mixture as in (b) was heat treated at a temperature of 315°C for 2 hours.

g. Fumed titanium dioxide and trimethylsilyl-end blocked dimethylsilicone oil were mixed together at a weight ratio of 1:1 and the mixture was heat treated at a temperature of 250°C for 4 hours.

Table 2

| Experiment number | Pt (ppm) | Titanium dioxide Treatment | Titanium dioxide parts by weight | Hardness (Shore A) | Tensile strength (kg/cm²) | Elongation (%) |
| --- | --- | --- | --- | --- | --- | --- |
| 1 | 0 | — | 0 | 50 | 91 | 600 |
| 6 | 42.5 | untreated | 10 | 55 | 65 | 320 |
| 9 | 42.5 | treated | 2 | 48 | 90 | 660 |

Table 3

| Experiment number | Volume resistivity (Ohm-cm) | | Dielectric strength (KV/mm.) | |
| --- | --- | --- | --- | --- |
| | before immersion in water | after immersion in water | before immersion in water | after immersion in water |
| 1 | $1.6 \times 10^{15}$ | $0.7 \times 10^{15}$ | 22 | 20 |
| 6 | $1.0 \times 10^{15}$ | $0.2 \times 10^{15}$ | 18 | 14 |
| 9 | $1.6 \times 10^{15}$ | $0.8 \times 10^{15}$ | 21 | 20 | h. Fumed titanium dioxide and diphenyldiethoxysilane were mixed together at a weight ratio of 1:1 and the mixture was heat treated at a temperature of 250°C for 1 hour.

8 types of test specimens were prepared by adding respective titanium dioxides prepared according to processes (a) through (h) to 100 parts by weight of polydimethylsiloxane gum which is convertible to silicone rubber and was prepared in the same manner as experiment No.4 of Example 1. The flame retardancy of the post cured silicone rubber test pieces molded from these compositions as measured and the results are shown in the following Table 4.

Table 4

| Experiment number | Treated TiO$_2$ | Burning time (seconds) | Burnt length (mm) |
|---|---|---|---|
| 13 | a | 31 | 10 |
| 14 | b | 30 | 11 |
| 15 | c | 25 | 8 |
| 16 | d | 36 | 13 |
| 17 | e | 17 | 2 |
| 18 | f | 20 | 8 |
| 19 | g | 43 | 17 |
| 20 | h | 39 | 14 |

EXAMPLE 3

The process steps of Example 1 were repeated by using a polydimethylsiloxane gum having a viscosity of 25,000,000 centistokes at 25°C and containing 5.0 mole % of diphenylsiloxane units and 0.2 mole % of methylvinylsiloxane units to obtain a silicone rubber composition similar to that obtained in Example 1. The same chloroplatinic acid and treated fumed titanium dioxide as Example 1 were incorporated into the silicone rubber composition to prepare test pieces which were tested their flame retardancy in the same manner as in Example 1. The results of test are shown in the following Table 5 in which experiment numbers 21, 22 and 23 represent control samples.

EXAMPLE 4

93 parts by weight of polydimethylsiloxane gum having a viscosity of 19,000,000 centistokes at 25°C and containing 0.1 mole % of methylvinylsiloxane units, 7 parts by weight of a polydimethylsiloxane having a viscosity of 10,000,000 centistokes at 25°C, and containing 10 mole % of methylvinylsiloxane units, 25 parts by weight of fumed silica, 30 parts by weight of fumed silica treated with a polydimethylsiloxane oil, and 5.0 parts by weight of a linear polysiloxane prepared by hydrolizing dimethyldichlorosilane and acting as a rubber process aid were mixed together according to a conventional method of admixing rubber compositions and the mixture was heat compounded for 3 hours at a temperature of 150°C. To the resulting silicone rubber compound three typical organic peroxides were added, each in an amount as shown in the following Table 6, the amount of the organic peroxides being based on 100 parts by weight of the polydimethylsiloxane gum. Furthermore, a platinum compound, treated and untreated fumed titanium dioxides identical to those used in Example 1 were added to the mixture in amounts as shown in Table 6 and the resulting mixtures were cold compounded. The resulting silicone rubber compositions were press cured, and the cured rubbers were cut into test pieces which were tested in the same manner as in Example 1. The following Table 7 shows the results of tests. In Table 7, experiment numbers 27, 28, 30, 31, 32, 34, 35, 36 and 38 show control specimens.

Table 6

| Experiment number | Organic peroxide | | Platinum (ppm) | Treated TiO$_2$ (parts by weight) | Untreated TiO$_2$ (parts by weight) |
|---|---|---|---|---|---|
| | | Parts by weight | | | |
| 27 | 2,4-dichloro- | 0.9 | 0 | 0 | 0 |
| 28 | benzoyl | 0.9 | 42.5 | 0 | 0 |
| 29 | peroxide | 0.9 | 42.5 | 10 | 0 |
| 30 | | 0.9 | 42.5 | 0 | 10 |
| 31 | Dicumyl per- | 0.4 | 0 | 0 | 0 |
| 32 | oxide | 0.4 | 42.5 | 0 | 0 |
| 33 | | 0.4 | 42.5 | 10 | 0 |
| 34 | | 0.4 | 42.5 | 0 | 10 |

Table 7

| Experiment number | Burning time (sec.) | Burnt length (mm) |
|---|---|---|
| 27 | 176 | Completely burnt |
| 28 | 112 | 78 |
| 29 | 18 | 7 |
| 30 | 52 | 21 |
| 31 | 184 | Completely burnt |
| 32 | 132 | 76 |
| 33 | 16 | 5 |
| 34 | 49 | 20 |
| 35 | 169 | Completely burnt |
| 36 | 127 | 80 |
| 37 | 23 | 7 |
| 38 | 51 | 18 |

Table 5

| Experiment number | Pt (ppm) | Treated TiO$_2$ (parts by weight) | Untreated TiO$_2$ (parts by weight) | Burning time (seconds) | Burnt length (mm) |
|---|---|---|---|---|---|
| 21 | 0 | 0 | 0 | 185 | Completely burnt |
| 22 | 42.5 | 0 | 0 | 45 | 5 |
| 23 | 42.5 | 0 | 10 | 33 | 5 |
| 24 | 42.5 | 2 | 0 | 18 | 3 |
| 25 | 42.5 | 5 | 0 | 8 | 0 |
| 26 | 42.5 | 10 | 0 | 6 | 0 |

EXAMPLE 5

To 100 parts by weight of a silicone rubber compound identical to that used in experiment No.1 in Example 1 were added 10 parts by weight of treated titanium dioxide which was prepared by admixing, at a weight ratio of 10:1, fumed titanium dioxide and polymethylphenylsiloxane oil containing 20 mole % of diphenylsiloxane units and having a viscosity of 155 centistokes at 25°C and then heating the mixture at a temperature of 250°C for 4 hours. Then, three types of platinum compounds were added to the mixture in amounts as shown in the following Table 8. The silicone rubber compositions thus obtained were press cured at a temperature of 120°C and under a pressure of 10 kg/cm$^2$ for 10 minutes and then post cured at a temperature of 150°C for 1 hour to prepare silicone rubber test pieces. Tests were performed to determine the effects of the type and amounts of the platinum compounds on the flame retardancy of the silicone rubbers and the results of the tests are shown in the following Table 8.

Table 8

| Experiment number | Platinum compound | Platinum (ppm) | Burning time (sec.) | Burnt length (mm) |
|---|---|---|---|---|
| 39 | Chloroplatinic acid | 20 | 28 | 11 |
| 40 |  | 100 | 32 | 9 |
| 41 | Chloroplatinic acid-vinyl-siloxane complex | 20 | 13 | 5 |
| 42 |  | 50 | 13 | 4 |
| 43 |  | 100 | 17 | 6 |
| 44 | Chloroplatinic acid-octyl-alcohol complex | 20 | 22 | 11 |
| 45 |  | 50 | 18 | 9 |
| 46 |  | 100 | 16 | 6 |

EXAMPLE 6

To 100 parts by weight of dimethylsiloxane identical to that used in experiment No. 1 in Example 1 were added chloroplatinic acid and treated fumed titanium dioxide prepared by admixing, at a weight ratio of 1:1, an alkoxy-end blocked silicone oil having a viscosity of 80 centistokes at 25°C and containing 30 mole % of diphenylsiloxane units and 70 mole % of dimethylsiloxane units and then heat treating the mixture at a temperature of 250°C for 4 hours, the amount of fumed titanium dioxide incorporated into the dimethylpolysiloxane gum being shown in the following Table 9. The resulting silicone rubber compositions were press cured at a temperature of 120°C and under a pressure of 50kg/cm$^2$ for 10 minutes and then post cured at a temperature of 150°C for 1 hour to prepare silicone rubber test pieces. The results of the flame retardancy tests of the silicone rubber test pieces are shown in the following table 9 in which experiment numbers 50 to 52 show control specimens.

corporating thereto a platinum compound and titanium dioxide treated with an organosiloxane or organosilane without affecting the mechanical and electrical properties of the resulting silicone rubber.

We claim:

1. A flame retardant silicone rubber composition comprising (A) 100 parts by weight of a polydiorganosiloxane gum containing organic groups selected from the group consisting of methyl, vinyl and phenyl groups, and containing from 0 to 2 mole % of silicon-bonded vinyl groups and from 0 to 10 mole % of silicon-bonded phenyl groups, the number of silicon-bonded organic groups being from 1.98 to 2.002 per silicon atom, (B) 10 to 100 parts by weight of a reinforcing inorganic filler, (C) 10 to 150 parts of platinum in the form of a platinum containing compound per million, by weight, based on the weight of said polydiorganosiloxane gum, (D) 0.3 to 30 parts by weight of titanium dioxide treated with an organosilane or an organosiloxane at a temperature of from 150° to 400°C, and (E) 0.1 to 10 parts by weight of a curing agent consisting of an organic peroxide.

2. The silicone rubber composition according to claim 1, wherein said titanium dioxide is fumed titanium dioxide having an average particle diameter of less than 0.1 micron.

3. The siloxane rubber composition according to claim 1, wherein said titanium dioxide is prepared by admixing fumed titanium dioxide and diphenyldiethoxy silane at a weight ratio of 1:1, and heat treating the resulting mixture at a temperature of 250°C for 1 hour.

4. The silicone rubber composition according to claim 1, wherein said treated titanium dioxide is prepated by admixing fumed titanium dioxide with an alkoxy group end-blocked silicone oil containing 30 mole % of diphenylsiloxane units and 70 mole % of dimethylsiloxane units and having a viscosity of 80 centistokes, at a weight ratio of 1:1, and heat treating the resulting mixture at a temperature of 250°C for 4 hours.

5. The silicone rubber composition according to claim 1, wherein said treated titanium dioxide is prepared by admixing fumed titanium dioxide with a trimethylsilyl group endblocked dimethyl polysiloxane, at a weight ratio of 1:1, and heat treating the resulting mixture at a temperature of 250°C for 4 hours.

6. The silicone rubber composition according to claim 1, wherein said platinum containing compound is selected from the group consisting of chloroplatinic acid, chloroplatinic acid-vinylsiloxane complex, chloroplatinic acid-octyl alcohol complex and a solution of chloroplatinic acid in iso-propyl alcohol.

7. The silicone rubber composition according to claim 1, wherein said curing agent is selected from the group consisting of 2,4-dichlorobenzoyl peroxide, dicumyl peroxide and ditertiary butyl peroxide.

Table 9

| Experiment number | Platinum (ppm) | Treated TiO$_2$ (parts by weight) | Untreated TiO$_2$ (parts by weight) | Burning time (sec.) | Burnt length (mm) |
|---|---|---|---|---|---|
| 47 | 42.5 | 5 | 0 | 54 | 20 |
| 48 | 42.5 | 10 | 0 | 39 | 13 |
| 49 | 42.5 | 20 | 0 | 21 | 8 |
| 50 | 42.5 | 0 | 5 | 78 | 36 |
| 51 | 42.5 | 0 | 10 | 67 | 32 |
| 52 | 42.5 | 0 | 20 | 43 | 23 |

From the foregoing description, it can be readily noted that this invention provides silicone rubber compositions of improved flame retardant property by in- 8. The silicone rubber composition according to claim 1, which further comprises a linear siloxane acting as a process aid.

9. The silicone rubber composition according to claim 1, wherein said reinforcing inorganic filler comprises a fume silica treated with a polydimethyl-siloxane oil.

10. The silicone rubber composition according to claim 1, wherein said reinforcing inorganic filler comprises a fume silica which is not treated with a polydimethyl-siloxane oil.

11. The silicone rubber composition according to claim 1, wherein said organosiloxane utilized to treat said titanium dioxide contains a unit selected from the group consisting of triorganosiloxane, diorganosiloxane and monoorganosiloxane units.

12. The silicone rubber composition according to claim 1, wherein said organo-silane utilized to treat said titanium dioxide is a member selected from the group consisting of triorganosilyl, diorganosilyl and monoorganosilyl.

13. The silicone rubber composition according to claim 1, wherein said organosilane or organosiloxane utilized to treat said titanium dioxide contains silicon bonded methyl and/or phenyl groups.

14. The silicone rubber composition according to claim 1, which further comprises at least one finely divided material selected from the group consisting of quartz, calcium carbonate, calcium zirconate, zirconate silicate diatomaceous earth, iron oxide, untreated titanium oxide, carbon black, heat resistant additives, process acid and antioxidants.

15. Silicone rubber prepared by curing the silicone rubber composition of claim 1 at a temperature of 150°C for 1 hour.

* * * * *